United States Patent
Miyashita

(10) Patent No.: US 11,833,746 B2
(45) Date of Patent: Dec. 5, 2023

(54) METHOD FOR PRODUCING THREE-DIMENSIONAL MOLDED OBJECT AND LAMINATION MOLDING APPARATUS

(71) Applicant: Sodick Co., Ltd., Kanagawa (JP)

(72) Inventor: Yasuyuki Miyashita, Yokohama (JP)

(73) Assignee: Sodick Co., Ltd., Yokohama (JP)

( * ) Notice: Subject to any disclaimer, the term of this patent is extended or adjusted under 35 U.S.C. 154(b) by 264 days.

(21) Appl. No.: 16/880,005

(22) Filed: May 21, 2020

(65) Prior Publication Data
US 2020/0384686 A1 Dec. 10, 2020

(30) Foreign Application Priority Data
Jun. 7, 2019 (JP) .................... 2019-107199

(51) Int. Cl.
- *B29C 67/00* (2017.01)
- *B29C 64/147* (2017.01)
- *B29C 64/268* (2017.01)
- *B29C 64/343* (2017.01)
- *B29C 64/393* (2017.01)

(Continued)

(52) U.S. Cl.
CPC .......... *B29C 64/147* (2017.08); *B29C 64/268* (2017.08); *B29C 64/343* (2017.08); *B29C 64/393* (2017.08); *B29C 64/209* (2017.08); *B29C 64/245* (2017.08); *B29C 64/25* (2017.08);

(Continued)

(58) Field of Classification Search
CPC ... B29C 64/147; B29C 64/343; B29C 64/393; B29C 64/268; B33Y 10/00; B33Y 30/00; B33Y 50/00; B33Y 50/02
See application file for complete search history.

(56) References Cited

U.S. PATENT DOCUMENTS 9,205,691 B1 * 12/2015 Jones .................... B33Y 10/00
2018/0009165 A1 1/2018 Agawa
(Continued)

FOREIGN PATENT DOCUMENTS

| JP | 2015196265 A | 11/2015 |
| JP | 2017160482 A | 9/2017 |

(Continued)

OTHER PUBLICATIONS

Japanese Office Action dated Dec. 10, 2020, in connection with corresponding JP Application No. 2019-107199 (8 pp., including machine-generated English translation).

*Primary Examiner* — Ryan M Ochylski
(74) *Attorney, Agent, or Firm* — Maier & Maier, PLLC

(57) ABSTRACT

A method for producing a three-dimensional molded object includes forming a solidified layer by irradiating an irradiation region of a material layer with a laser beam or an electron beam, obtaining data about projections having a height higher than a predetermined value formed on a surface of the solidified layer, calculating heights of the projections, areas of the projections, or the number of the projections based on the data, and determining a molded state of the solidified layer by making a comparison between the calculated heights of the projections and a first threshold relating to heights of the projections, between the calculated areas of the projections and a second threshold relating to an areas of the projections, or between the calculated number of the projections and a third threshold relating to the number of the projections.

8 Claims, 8 Drawing Sheets

(51) Int. Cl.
  *B33Y 10/00*    (2015.01)
  *B29C 64/371*   (2017.01)
  *B33Y 50/02*    (2015.01)
  *B29C 64/245*   (2017.01)
  *B29C 64/25*    (2017.01)
  *B29C 64/209*   (2017.01)
  *B33Y 30/00*    (2015.01)

(52) U.S. Cl.
  CPC ............. *B29C 64/371* (2017.08); *B33Y 10/00* (2014.12); *B33Y 30/00* (2014.12); *B33Y 50/02* (2014.12)

(56)        References Cited

U.S. PATENT DOCUMENTS

2018/0169951 A1*   6/2018   Niitani .................... B22F 12/90
2019/0177835 A1*   6/2019   Baduvamanda ...... C23C 14/345

FOREIGN PATENT DOCUMENTS

JP      2017-202601  A    11/2017
JP      2018-003147  A     1/2018
WO       2019030837 A1     2/2019
WO       2019030839 A1     2/2019

* cited by examiner

METHOD FOR PRODUCING THREE-DIMENSIONAL MOLDED OBJECT AND LAMINATION MOLDING APPARATUS

FIELD

The present application claims priority under 35 U.S.C. § 119 to Japanese Patent Application No. 2019-107199, filed Jun. 7, 2019. The contents of this application are incorporated herein by reference in their entirety. The present invention relates to a method for producing a three-dimensional molded object and lamination molding apparatus.

BACKGROUND

There are various lamination molding methods. For example, powder bed fusion is a method to produce a desired three-dimensional molded object by repeating formation of a material layer made of a material powder and formation of a solidified layer by irradiation of the material layer with a beam, such as a laser beam or electron beam.

Lamination molding apparatuses have been used not only to manufacture prototypes but also to manufacture end use products, such as dies and molds, medical parts, and aerospace parts. For this reason, lamination molding apparatuses capable of manufacturing high-quality molded objects are being requested. For example, U.S. Unexamined Patent Application Publication No. 2018/0009165 discloses a method of suppressing changes in characteristics or shape accuracy of a molded object by controlling an irradiation beam in accordance with the surface state of a material layer.

SUMMARY

Defects often occur in the object during molding. For example, voids occur in the object not after molding but during molding. Also, there is a correlation between an internal state of the laminated solidified layers and a surface state of a solidified layer. Accordingly, by observing the surface state of the solidified layer during molding, it can be determined whether the molded state, including the internal state of the object, is good or poor.

An object of the present invention is to provide a method for producing a three-dimensional molded object and lamination molding apparatus that are able to determine whether the molded state of a molded object being molded in the lamination molding process is good or poor, by observing the surface state of the molded object.

The present invention provides a method for producing a three-dimensional molded object. The method includes forming a solidified layer by irradiating an irradiation region of a material layer with a laser beam or an electron beam, obtaining data about projections having a height higher than a predetermined value formed on a surface of the solidified layer, calculating heights of the projections, an area of the projections, or the number of the projections based on the data, and determining a molded state of the solidified layer by making a comparison between the calculated heights of the projections and a first threshold relating to heights of the projections, between the calculated area of the projections and a second threshold relating to an area of the projections, or between the calculated number of the projections and a third threshold relating to the number of the projections.

The present invention also provides a lamination molding apparatus that molds a desired three-dimensional molded object. The apparatus includes an irradiator configured to form a solidified layer by irradiating an irradiation region of a material layer with a laser beam or an electron beam, a meter configured to obtain data about projections having a height higher than a predetermined value formed on a surface of the solidified layer, a memory configured to store a first threshold relating to heights of the projections, a second threshold relating to an area of the projections, or a third threshold relating to the number of the projections, and a processor configured to calculate the heights of the projections, the area of the projections, or the number of the projections based on the data and to determine a molded state of the solidified layer by making a comparison between the calculated heights of the projections and the first threshold, between the calculated area of the projections and the second threshold, or between the calculated number of the projections and the third threshold.

The method for producing a three-dimensional molded object and lamination molding apparatus according to the present invention are configured to measure the state of the projections formed on the surface of the solidified layer and to determine whether the molded state is good or poor. This configuration is able to determine whether the molded state of the molded object is good or poor during molding and thus to produce a highly accurate three-dimensional molded object.

DETAILED DESCRIPTION

Now, an embodiment of the present invention will be described with reference to the drawings. Various features described in the embodiment below may be combined with each other.

Figure 1:
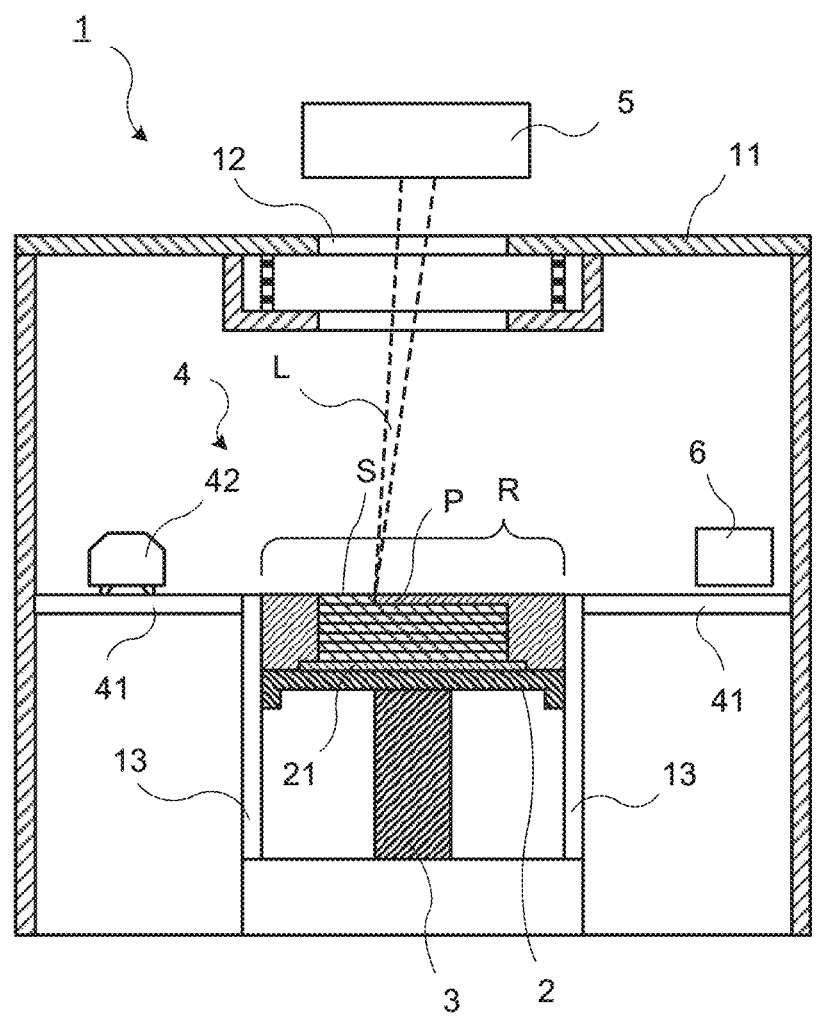
FIG. 1 is a schematic configuration view of a lamination molding apparatus according to an embodiment of the present invention.

As shown in FIG. 1, a lamination molding apparatus 1 includes a chamber 11, a material layer formation device 4, a table 2, an irradiator 5, and a meter 6.

The chamber 11 is formed so as to be substantially sealed and covers a molding region R in which a desired three-dimensional molded object is formed. Desirably, the chamber 11 is filled with an inert gas. The inert gas is a gas that does not substantially react with a material layer P or a solidified layer S and is, for example, nitrogen or argon.

The material layer formation device 4 is disposed in the chamber 11 and forms the material layer P having a predetermined thickness in the molding region R. The material layer formation device 4 includes a base 41 and a recoater head 42. The recoater head 42 is disposed on the base 41 and is reciprocated on the molding region R in one horizontal direction by a recoater head drive section including any type of actuator, such as a motor 44.

Figure 2:
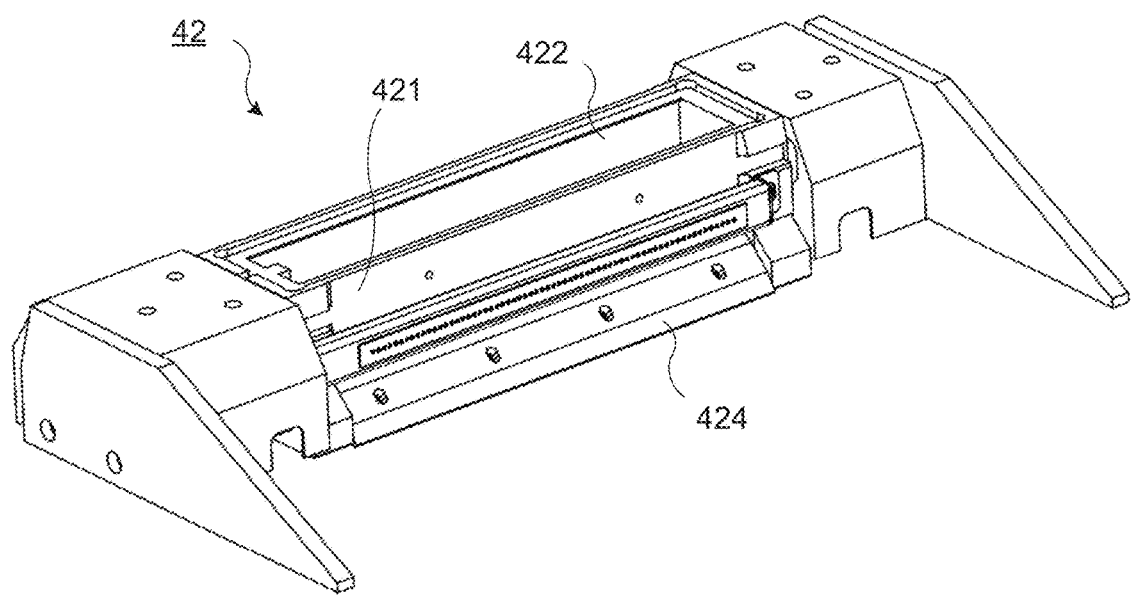
FIG. 2 is a perspective view of a recoater head seen from above.
Figure 3:
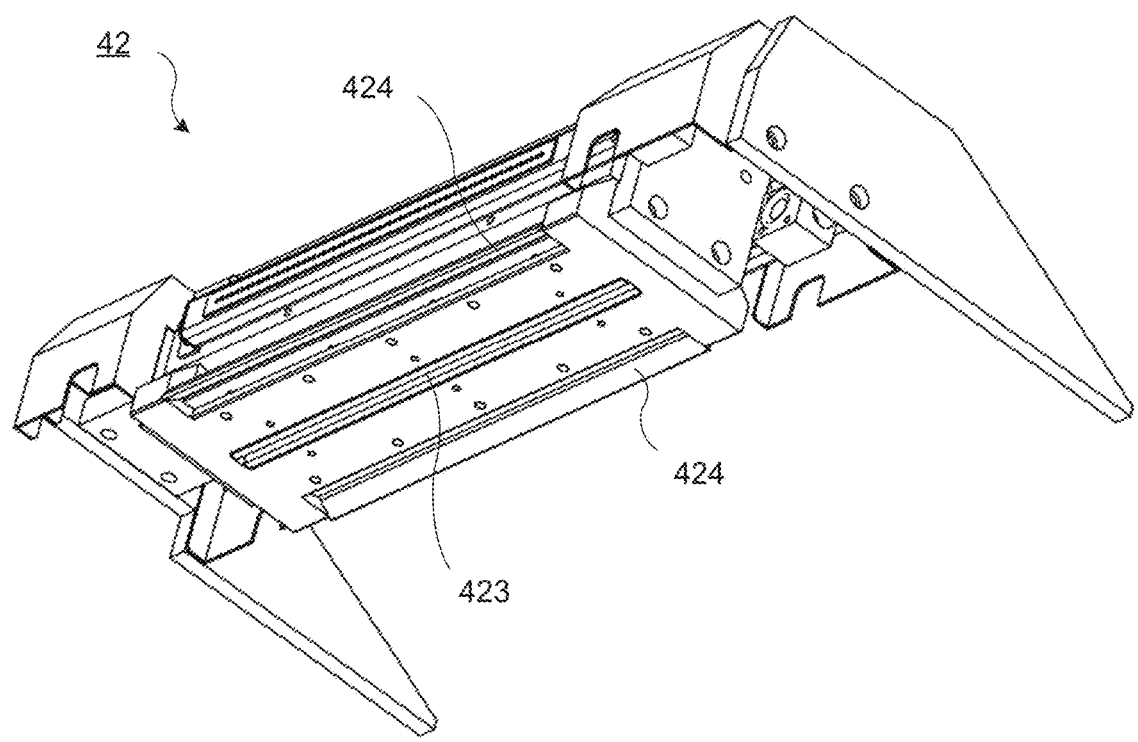
FIG. 3 is a perspective view of the recoater head seen from below.

As shown in FIGS. 2 and 3, the recoater head 42 includes a material container 421, a material supplying section 422, and a material discharging section 423. The material container 421 stores a material powder. The material supplying section 422 is disposed on a top surface of the material container 421 and serves as a receiver of the material powder supplied from a material supplier (not shown) to the material container 421. The material discharging section 423 is disposed on a bottom surface of the material container 421 and discharges the material powder stored in the material container 421. The material discharging section 423 is in a shape of a slit and extends in one horizontal direction perpendicular to the movement direction of the recoater head 42. A blade 424 is disposed on one side surface or both sides surfaces of the recoater head 42. With movement of the recoater head 42, the blade 424 flattens the material powder discharged from the recoater head 42 so that the material layer P is formed on the molding region R.

The table 2 is disposed in the molding region R. The table 2 is vertically moved by a table drive device 3 including any type of actuator. In the present embodiment, the table drive device 3 includes a slide base disposed under the table 2, a feed screw, and a guide base that supports the feed screw. The feed screw of the table drive section 3 includes a screw shaft, a nut fastened to the screw shaft and fixed to a side surface of the slide base, and a motor 32 that rotates the screw shaft. Powder holding walls 13 are disposed around the table 2. An unsolidified material powder is held in a space surrounded by the table 2 and the powder holding walls 13. When forming a three-dimensional molded object, a base plate 21 may be placed on the table 2. In this case, the first material layer P is formed on the base plate 21.

Figure 4:
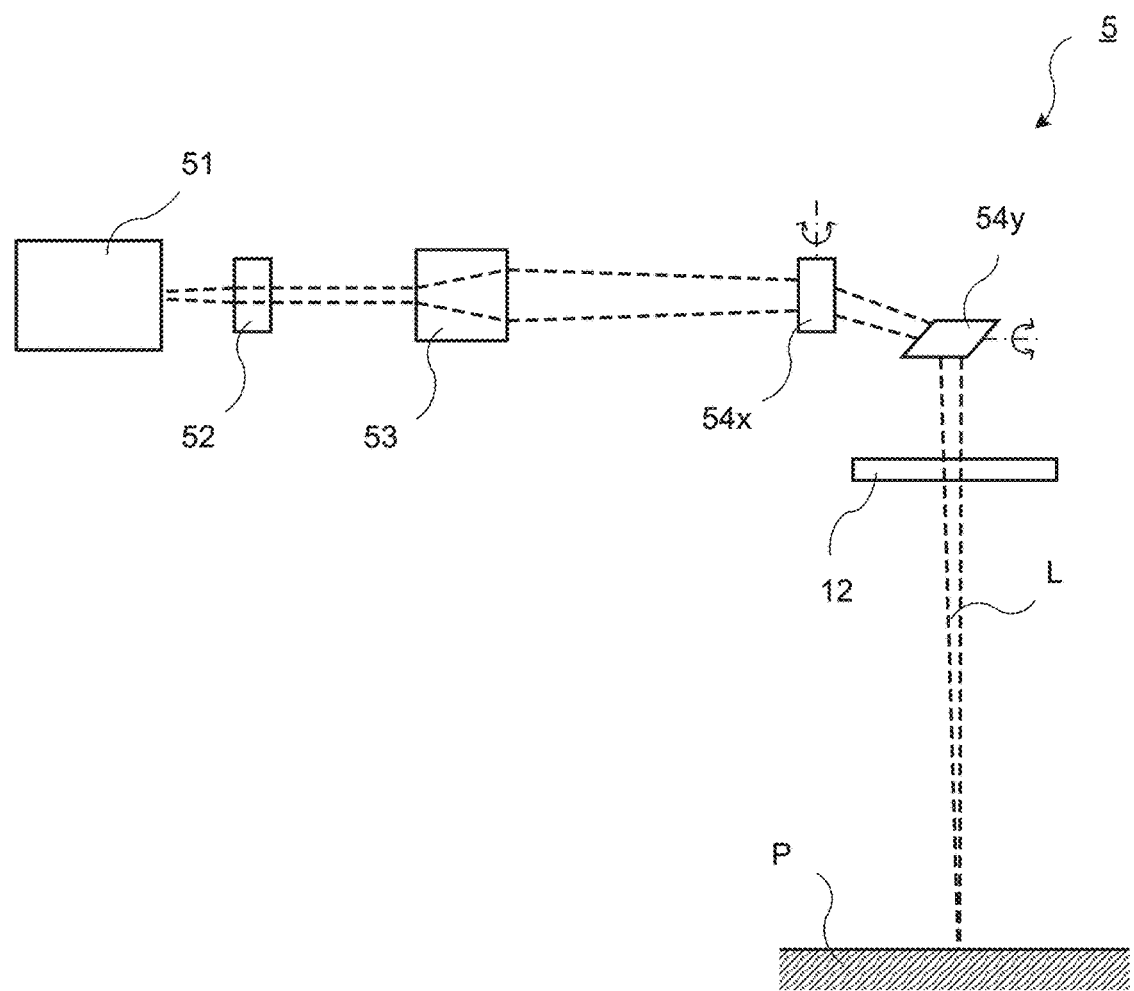
FIG. 4 is a schematic configuration view of an irradiator.

The irradiator 5 is disposed above the chamber 11. The irradiator 5 irradiates a predetermined irradiation region of the material layer P formed in the molding region R with a laser beam L so that the material layer P is melted or sintered in the irradiation position, thereby forming the solidified layer S. The irradiation region exists in the molding region R and approximately matches a region surrounded by an outline of the three-dimensional molded object for each divided layer. As shown in FIG. 4, the irradiator 5 includes a light source 51, a collimator 52, a focus control unit 53, and a scanner. The scanner is, for example, a galvano scanner including a pair of galvano mirrors 54x and 54y and actuators 56x and 56y that rotate the galvano mirrors 54x and 54y, respectively.

The light source 51 is a laser that generates laser beams L and may be any type of layer as long as it is able to sinter or melt the material layer P. For example, the light source 51 is a fiber laser, a CO2 laser, or a YAG laser. The collimator 52 converts a laser beam L outputted from the light source 51 into a parallel beam. The focus control unit 53 includes a movable lens 531 that controls a focus position and a motor 532 that moves the movable lens 531 back and forth. The focus control unit 53 controls a diameter of the laser beam L outputted from the light source 51 to a predetermined beam diameter. The rotation angle of the galvano mirrors 54x and 54y is controlled in accordance with the magnitude of a rotation angle control signal received from an irradiation controller 77. The galvano mirrors 54x and 54y control the irradiation position of the laser beam L by reflecting and scanning the laser beam L.

The laser beam L reflected by the galvano mirrors 54x and 54y passes through a window 12 disposed on a top surface of the chamber 11, and the material layer P is irradiated with the laser beam L. The material layer P is melted or sintered by the laser beam L, and the solidified layer S is formed. The window 12 protects the irradiator 5 from fumes or the like. The window 12 is formed of a material capable of transmitting the laser beam L. If the light source 51 is the fiber laser or the YAG laser, the window 12 may be formed of, for example, quartz glass.

The irradiator may be a device that sinters or melts the material layer P to form the solidified layer S by irradiating the material layer P with an electron beam. Such an irradiator includes, for example, a cathode electrode, an anode electrode, a solenoid, and a collector electrode. The cathode electrode emits electrons, and the anode electrode collects and accelerates the electrons. The solenoid forms a magnetic field so that the electron beam converges in one direction. The collector electrode is electrically connected to the material layer P, and a voltage is applied between the collector electrode and the cathode electrode.

Formation of the material layer P and formation of the solidified layer S are performed for each of the divided layers which is obtained by dividing the desired three-dimensional molded object with a predetermined thickness. In this case, it is technically difficult to completely flatten a surface of each solidified layer S, and slight protruding parts can be formed on the surface of the solidified layer S. In other words, when forming the solidified layer S by irradiating the material layer P with the laser beam L or the electron beam, projections can be formed on the surface of the solidified layer S. The projection has a height higher than a predetermined value. That is, the protruding part which is large enough to use to determine the molded state may be treated as the projection.

The meter 6 obtains data about the projections formed on the surface of the solidified layer S by measuring the state of the projections. Specifically, the meter 6 obtains data about the projections by measuring the top surface of the solidified layer S which is formed last immediately before measuring. The meter 6 may be any type of device capable of obtaining data about the projections and is, for example, a two-dimensional laser displacement meter (e.g. based on white light interferometry), a laser microscope, or a three-dimensional scanner. In the present embodiment, the two-dimensional laser displacement meter is used as the meter 6.

Figure 5:
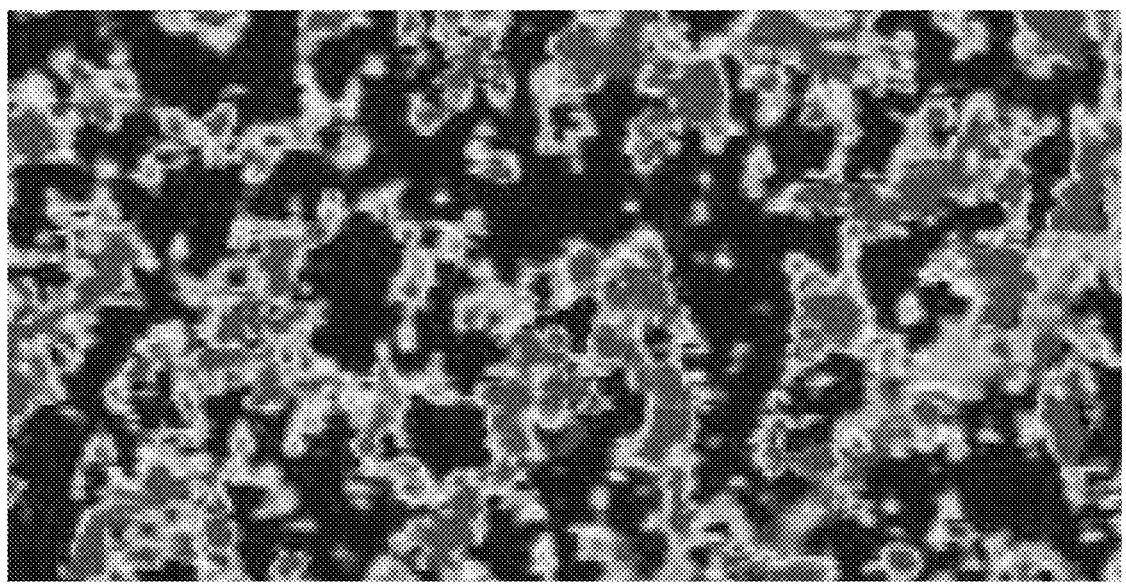
FIG. 5 is a contour diagram showing measurement results obtained by a meter.

The meter 6 obtains data about the projections by measuring height of each position of the surface of the solidified layer S from a reference surface. The reference surface can be optionally set. In the present embodiment, a molded surface, that is, a top surface of the material layer P during forming the solidified layer S is set as the reference surface. The meter 6 obtains values representing the heights. FIG. 5 visibly shows this value as a contour diagram.

A sensor of the meter 6 may be fixed to a predetermined position in the chamber 11 as long as the meter 6 is able to make measurements in an entire molding region R. Also, if a region in which the meter 6 is able to make measurements is smaller than the molding region R, the sensor of the meter 6 may be configured to be able to move in the chamber 11. In other words, there may be disposed a meter drive device including any type of actuator that moves the entire meter 6 or a part including the sensor of the meter 6 to a desired position in the chamber 11. This meter drive device may be used also as a drive device of another device, or may be used solely for the meter 6. The sensor of the meter 6 may be configured to be able to move in one horizontal direction, or may be configured to be able to move in two horizontal directions. Also, the sensor of the meter 6 may be configured to be able to move in the horizontal direction(s), as well as in a vertical direction. In the present embodiment, the meter 6 is configured to be able to move in the direction of an X-axis, which is a predetermined horizontal direction, the direction of a Y-axis, which is a horizontal direction perpendicular to the X-axis, and the direction of a Z-axis, which is a vertical direction. The meter drive device includes a motor 62*x*, a motor 62*y*, and a motor 62*z*.

Figure 6:
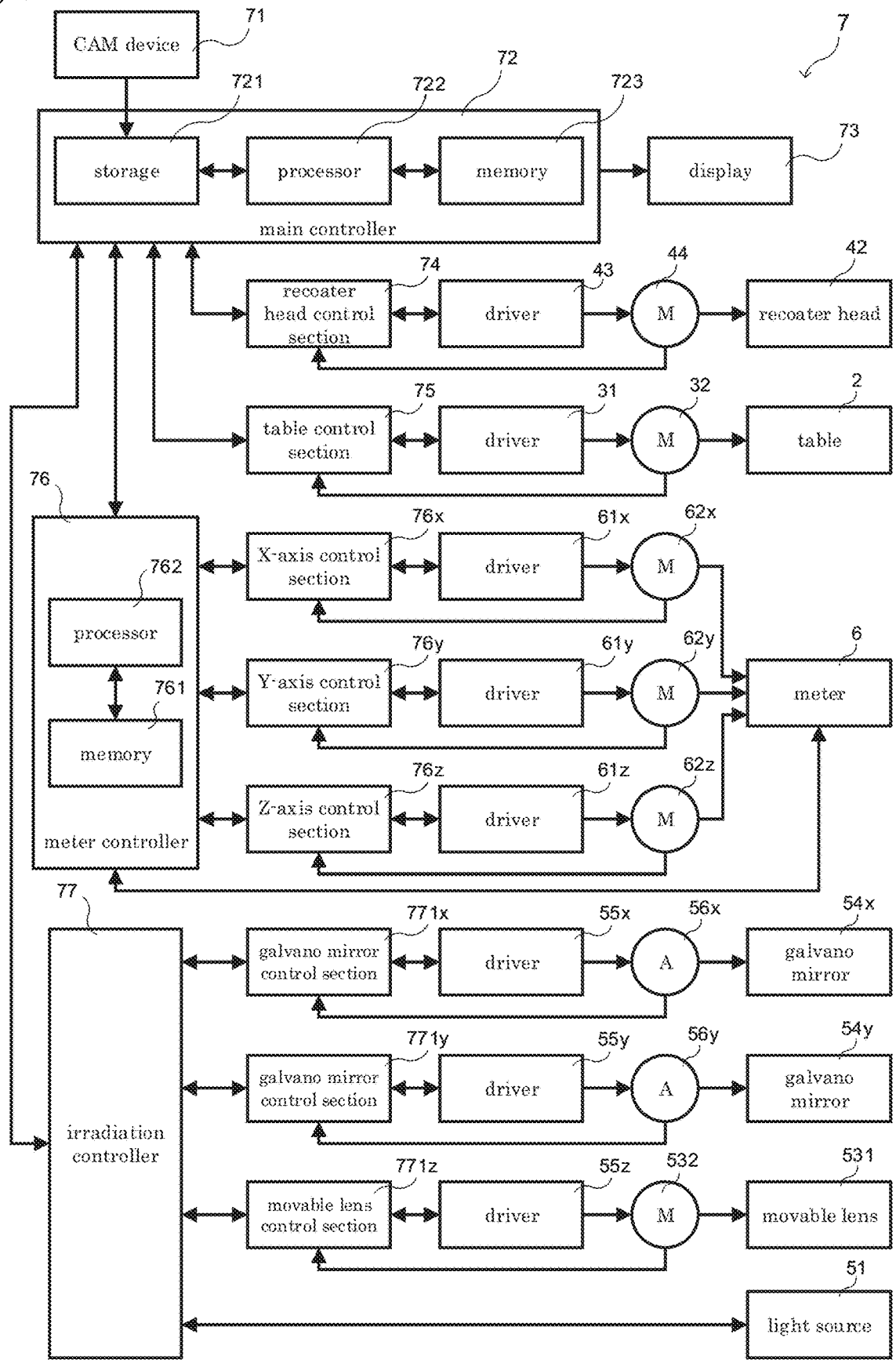
FIG. 6 is a block diagram of a controller.

A controller 7 that controls the lamination molding apparatus 1 will be described below. As shown in FIG. 6, the controller 7 includes a main controller 72, a display 73, a recoater head control section 74, a table control section 75, a meter controller 76, an X-axis control section 76*x*, a Y-axis control section 76*y*, a Z-axis control section 76*z*, an irradiation controller 77, a galvano mirror control section 771*x*, a galvano mirror control section 771*y*, and a movable lens control section 771*z*. The controller 7 controls the material layer formation device 4, table 2, irradiator 5, and meter 6.

A CAM device 71 makes a project file including a main program and a molding program, for producing the desired three-dimensional molded object. The main program consists of multiple program lines assigned sequence numbers. Each program line includes a command to sinter or melt in the predetermined divided layer or a command to be issued to the meter 6. The molding program includes a command to specify the position that is irradiated with a laser beam L, or the like.

The main controller 72 controls each device in accordance with the project file made by the CAM device 9. The main controller 72 includes a storage 721, a processor 722, and a memory 723. The storage 721 stores the project file acquired from the CAM device 71 through a communication line or a transportable storage medium. The processor 722 analyzes the project file stored in the storage 721 and performs processing for controlling the material layer formation device 4, table 2, and the like. The memory 723 temporarily stores numerical values or data that need to be temporarily stored while the processor 722 performs processing.

The display 73 is connected to the main controller 72 and displays data, an error message, or the like reported from the main controller 72. Measurement results or the like obtained by the meter 6 may be displayed on the display 73.

The recoater head control section 74 controls the position of the recoater head 42 based on a command from the main controller 72. A command from the recoater head control section 74 is inputted to a driver 43, which then outputs a drive current corresponding to the command to the motor 44. Thus, the recoater head 42 moves on the base 41. The recoater head control section 74 may also perform feedback control basesd on a signal from the driver 43, a signal from an encoder (not shown) disposed on the motor 44, or the like.

The table control section 75 controls the position of the table 2 based on a command from the main controller 72. A command from the table control section 75 is inputted to a driver 31, which then outputs a drive current corresponding to the command to the motor 32. Thus, the table 2 is moved in a vertical direction. The table control section 75 may also perform feedback control based on a signal from the driver 31, a signal from an encoder (not shown) disposed on the motor 32, or the like.

The meter controller 76 controls the meter 6 and meter drive device based on a command from the main controller 72. The meter controller 76 includes a memory 761 and a processor 762.

The memory 761 stores thresholds used to determine a molded state of the solidified layer S. The thresholds are values relating to states of the projections and represent boundaries between the good surface state of the solidified layer S and the poor surface state of the solidified layer S.

Specifically, the memory 761 stores at least one of a first threshold, a second threshold, and a third threshold. When determining the molded state, any one or more of the first threshold, second threshold, and third threshold may be used.

The first threshold is a threshold relating to heights of the projections. The heights of the projections may be represented by ratios with respect to the height of one solidified layer S, or may be represented by an absolute values of the heights from the reference surface. If projections having heights exceeding the first threshold are detected on the surface of the solidified layer S, it is determined that the surface state of the solidified layer S is poor.

The second threshold is a threshold relating to an area of the projections. The area of the projections may be an absolute value obtained by summing up the areas of the respective projections, or may be a ratio with respect to an area of the irradiation region of a solidified layer S to be measured. The meter controller 76 may be configured such that an operator can make a selection on whether the absolute value or ratio is used as the second threshold. If the area of the projections formed on the solidified layer S exceeds the second threshold, it is determined that the surface state of the solidified layer S is poor. Note that multiple values corresponding to the heights of the projections may be set as second thresholds. For example, when the heights of the projections are less than m, a second threshold A1 may be set; when the heights of the projections are equal to or greater than m and smaller than n, a second threshold A2 may be set; and when the heights of the projections are equal to or greater than n, a second threshold A3 may be set (0<m<n, A1>A2>A3). In this case, the area of the projections is determined for each of the height ranges of the projections. Note that even if the area of the projections is determined for each of the height ranges of the projections, if the sum of the areas of the projections exceeds a predetermined value, it may be determined that the surface state is poor.

The third threshold is a threshold relating to the number of the projections. When detecting the number of the projections, the entire uppermost solidified layer S may be measured, or only a predetermined region set in the uppermost solidified layer S may be measured. In the latter case, a threshold relating to the number of projections formed per unit area may be set as the third threshold. If the number of projections formed on the surface of the solidified layer S exceeds the third threshold, it is determined that the surface state of the solidified layer S is poor. Note that multiple values corresponding to the heights of the projections may be set as third thresholds. For example, when the heights of the projections are less than p, a third threshold B1 may be set; when the heights of the projections are equal to or greater than p and smaller than q, a third threshold B2 may be set; and when the heights of the projections are equal to or greater than q, a third threshold B3 may be set (0<p<q, B1>B2>B3). In this case, the number of the projections is determined for each of the height ranges of the projections. Note that even if the number of the projections is determined for each of the height ranges of the projections, if the sum of the numbers of the projections exceeds a predetermined value, it may be determined that the surface state is poor.

The processor 762 acquires the data about the projections measured by the meter 6 and calculates at least one of the heights, the area, and the number of the projections based on the data. The processor 762 then determines the molded state of the solidified layer S by making at least one of a comparison between the heights of the projections and the first threshold, a comparison between the area of the projections and the second threshold, and a comparison between the number of the projections and the third threshold.

In the embodiment, the meter 6 measures the height of each position of the surface of the solidified layer S from the reference surface to output the data. The processor 762 analyzes the data and calculates the heights, the area, or the number of the projections of the solidified layer S. The processor 762 may use various algorisms in this calculation. For example, if the measurement results obtained by the meter 6 are represented by a contour diagram as shown in FIG. 5, the processor 762 may calculate the heights and the like of the projections using an image processing algorism.

The X-axis control section $76x$, Y-axis control section $76y$, and Z-axis control section $76z$ control the position of the meter 6 on the X-axis, Y-axis, and Z-axis based on commands from the meter controller 76. Commands from the X-axis control section $76x$, Y-axis control section $76y$, and Z-axis control section $76z$ are inputted to a driver $61x$, a driver $61y$, and a driver $61z$, respectively, which then output drive currents corresponding to the commands to the motor $62x$, motor $62y$, and motor $62z$, respectively. Thus, the meter 6 is located in a desired position in the chamber 11. The X-axis control section $76x$, Y-axis control section $76y$, and Z-axis control section $76z$ may also perform feedback control based on signals from the driver $61x$, driver $61y$ and driver $61z$, signals from encoders (not shown) disposed on the motor $62x$, motor $62y$, and motor $62z$, or the like.

For example, assume that the meter 6 is the two-dimensional laser displacement meter; a measurement width measurable by the meter 6 is 7 mm; and the area of the top surface of the solidified layer S to be measured is 70 mm×70 mm. In this case, the meter controller 76 outputs a command to control the height of the meter 6 to a proper height to the Z-axis control section $76z$. Then, the meter controller 76 repeat outputting a command to move the meter 6 in the direction of the X-axis by 70 mm to the X-axis control section $76x$, and outputting a command to move the meter 6 in the direction of the Y-axis by 7 mm, using a corner of the solidified layer S as the start point. During the movement of the meter 6 in the direction of the X-axis, the meter controller 76 outputs a command to make the measurement to the meter 6. That is, a total of ten measurements are performed. Note that if the measurement width of the meter 6 is equal to or greater than the length of a short side of the molding region R, the meter 6 may be configured to be able to move only in one horizontal direction.

The irradiation controller 77 receives the molding program from the main controller 72 and outputs commands to the galvano mirror control section $771x$, galvano mirror control section $771y$, and movable lens control section $771z$ based on the molding program. The irradiation controller 77 also outputs a command to the light source 51 to control the intensity or the on/off switch of the laser beam L.

The galvano mirror control section $771x$ controls the angle of the galvano mirror $54x$ based on the command from the irradiation controller 77. A command from the galvano mirror control section $771x$ is inputted to a driver $55x$, which then outputs a drive current corresponding to the command to an actuator $56x$. Thus, the galvano mirror $54x$ is rotated. The galvano mirror control section $771x$ may also perform feedback control based on a signal from the driver 55, a signal from an encoder (not shown) disposed on the actuator $56x$, or the like.

The galvano mirror control section $771y$ controls the angle of the galvano mirror $54y$ based on the command from the irradiation controller 77. A command from the galvano mirror control section $771y$ is inputted to a driver $55y$, which then outputs a drive current corresponding to the command to an actuator $56y$. Thus, the galvano mirror $54y$ is rotated. The galvano mirror control section $771y$ may also perform feedback control based on a signal from the driver $55y$, a signal from an encoder (not shown) disposed on the actuator $56y$, or the like.

The movable lens control section $771z$ controls the position of the movable lens 531 based on the command from the irradiation controller 77. A command from the movable lens control section $771z$ is inputted to a driver $55z$, which then outputs a drive current corresponding to the command to the motor 532. Thus, the movable lens 531 is positioned, and the focus position of the laser beam L is changed, resulting in acquisition of a desired beam diameter. The movable lens control section $771z$ may also perform feedback control based on a signal from the driver $55z$, a signal from an encoder (not shown) disposed on the motor 532, or the like.

The above-mentioned configuration of the controller 7 is only illustrative, and various modifications may be made thereto as long as the present invention can be carried out. For example, while, in the present embodiment, the meter controller 76 that controls the meter 6 and determines the molded state is disposed separately from the main controller 72, the main controller 72 and meter controller 76 may be formed integrally. That is, the memory 723 may store the thresholds, and the processor 722 may perform processing and comparison relating to the determination of the molded state.

Figure 7:
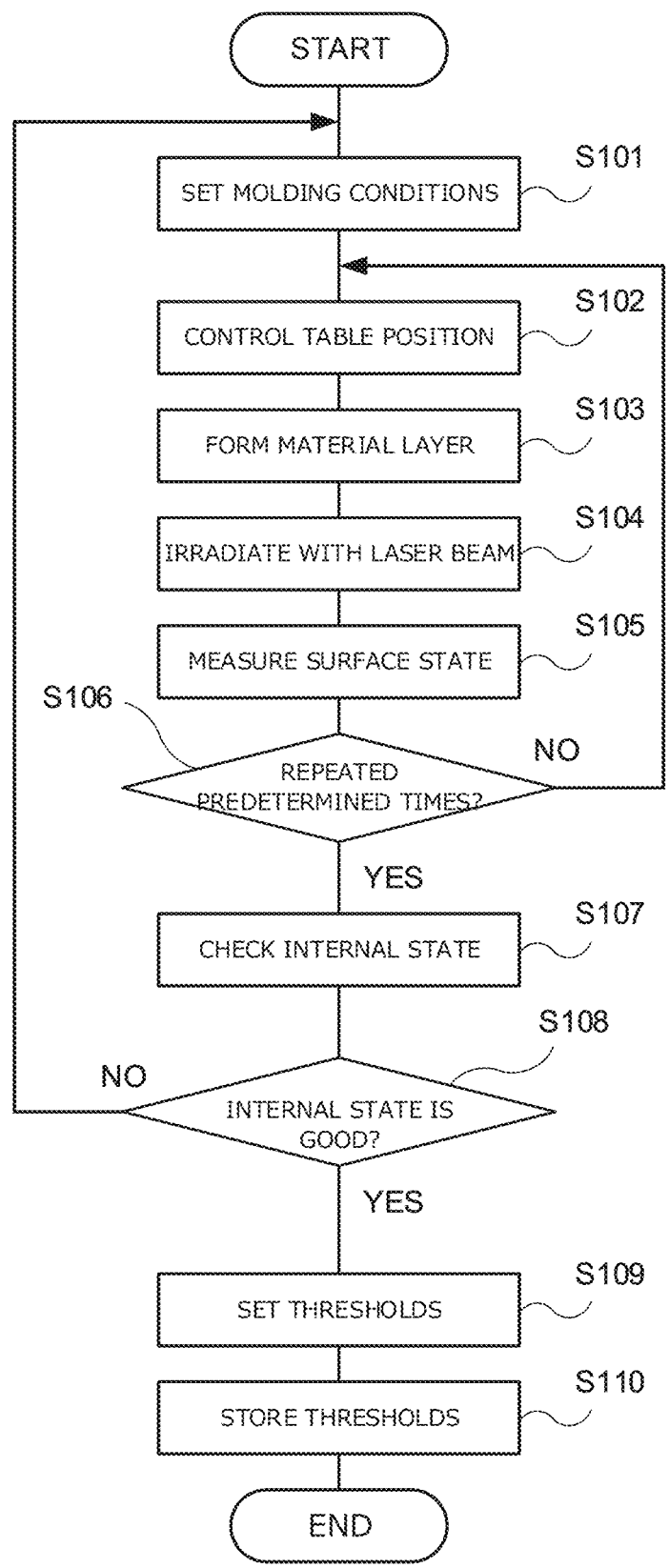
FIG. 7 is a flowchart showing a threshold determination method.

When determining the thresholds, it is desirable to previously obtain thresholds and optimize the molding conditions by molding a test piece. Before molding the desired three-dimensional molded object, the test piece is molded under the same conditions as those under which the desired three-dimensional molded object is molded. The meter 6 obtains data about projections formed on at least a part of the surface of the test piece. The processor 762 calculates the thresholds based on the data about the projections and an internal state of the test piece. FIG. 7 shows a series of steps of calculation of the thresholds.

To mold the test piece, molding conditions are set (S101). The molding condition for molding the test piece is a molding conditions which are assumed to be used for molding the desired three-dimensional molded object is molded after determining the thresholds. Examples of the molding conditions include a laser power, a scanning speed, a spot diameter, a laser pitch, a laser-off time, a layer thickness, a type of material, and a type of base plate 21. The term "laser power" refers to a power of the laser beam L outputted from the light source 51. The term "scanning speed" refers to a movement speed of the laser beam L scanned by the scanner. The term "spot diameter" refers to a size of the beam diameter in the focus position of the laser beam L. For example, the laser beam L is scanned as follows: the irradiation region is divided into a predetermined width; the laser beam L is scanned in the width direction; each time the scanning in the width direction is finishes, the irradiation with the laser beam L is temporarily stopped and the irradiation position is moved in the length direction perpendicular to the width direction; and the laser beam L is irradiated again and scanned in the width direction. The term "laser pitch" refers to a distance between the scanning paths adjacent in the width direction. The laser-off time refers to a time duration during which irradiation of a laser beam L is stopped. The term "layer thickness" refers to the thickness of one divided layer, that is, the thickness of one material layer P.

After the molding conditions are set, the lamination molding apparatus 1 molds the test piece. First, the position of the table 2 is controlled to a height at which the material layer P having the predetermined thickness can be formed (S102). Thereafter, each time one solidified layer S is formed, the table 2 is lowered by the thickness of one material layer P. Then, the recoater head 42 forms the material layer P while moving on the molding region R (S103). Then, the irradiator 5 forms the solidified layer S by irradiating the irradiation region of the material layer P with the laser beam L (S104).

The meter 6 obtains data about projections by measuring the height of each position of the surface of the solidified layer S from the reference surface (S105). The meter 6 may measure the entire surface or a part of the surface of the solidified layer S which is formed last immediately before measuring. In other words, the meter 6 obtains data about projections formed on at least a part of the surface of the solidified layer S.

The above-mentioned steps are repeated predetermined times (YES in S106) and thus any number of solidified layers S are stacked. The test piece may be in any shape. For example, the solidified layer S of the test piece may be in the shape of a rectangular parallelepiped. The solidified layer S of the test piece may be in the same shape as that of the desired three-dimensional molded object to be molded later. If the solidified layer S of the test piece has the same shape as the solidified layer S of the desired three-dimensional molded object, it is preferable that the meter 6 measure the entire surface of the solidified layer S to obtain the data about the projections. Thus, more accurate thresholds can be calculated.

Then, the internal state of the test piece is identified (S107). When checking the internal state, the top surface of the test piece may be cut as necessary. If the lamination molding apparatus 1 includes a cutting device, it is able to cut the test piece on the lamination molding apparatus 1. The internal state may be visually checked by the operator, or may be checked using any type of inspection device. For example, the internal state is checked by counting the number of voids per predetermined unit area.

If the internal state of the test piece is poor (NO in S108), the operator reconsiders the molding conditions and sets new molding conditions again, and a test piece is molded again. If the internal state of the test piece is good (YES in S108), the thresholds are set based on the measurement results obtained by the meter 6 (S109).

To set the thresholds, first, the processor 762 acquires the data about the projections measured by the meter 6 and calculates the heights, the area, and the number of the projections based on the data. Data indicating the calculation results is outputted to the main controller 72 and displayed on the display 73. The operator inputs thresholds, such as the first threshold, second threshold, and third threshold, to the main controller 72 with reference to the data indicating an average value, a maximum value, or the like of the heights, the area, and the number of the projections. The data of the projections may indicate data for each solidified layer S or data of the sum of the entire test piece. The values of the thresholds are outputted to the meter controller 76 and stored in the memory 761 (S110).

While, in the present embodiment, the operator sets the thresholds, the thresholds may be automatically calculated based on the data about the projections of the test piece.

Note that if the blade 424 collides with the projection during molding of the test piece, it is preferred to set a lower value than the height of the collided projection as the first threshold. This configuration is able to avoid the blade 424 from colliding with the projection during molding of the desire three-dimensional molded object.

Figure 8:
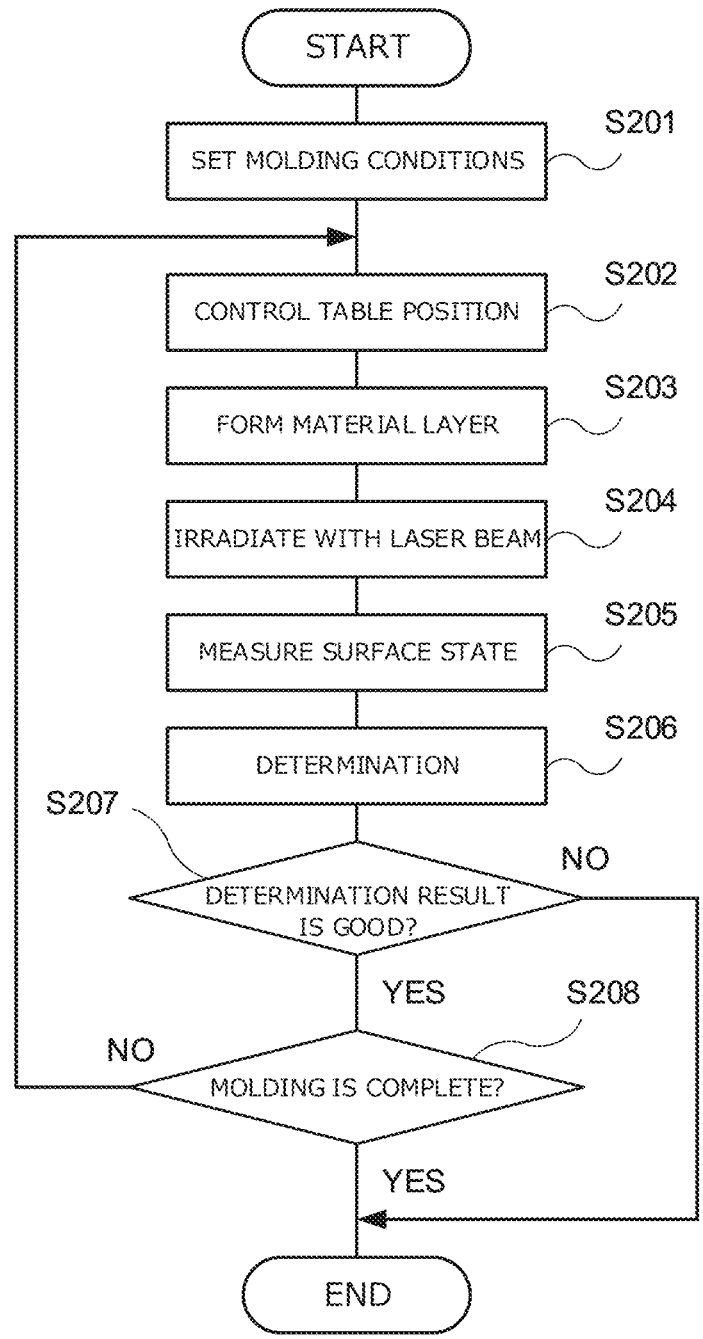
FIG. 8 is a flowchart showing a method for producing a three-dimensional molded object.

After the thresholds are set in accordance with the above steps, the lamination molding apparatus 1 produces the desired three-dimensional molded object in accordance with steps shown in FIG. 8.

First, the same molding conditions as those under which the test piece has been molded are set (S201). These molding conditions are ones that have been optimized through the molding of the test piece.

After the molding conditions are set, the lamination molding apparatus 1 molds the desired three-dimensional molded object. First, the position of the table 2 is controlled to the height at which the material layer P having the predetermined thickness can be formed (S202). Thereafter, each time one solidified layer S is formed, the table 2 is lowered by the thickness of one material layer P. Then, the recoater head 42 forms the material layer P while moving on the molding region R (S203). Then, the irradiator 5 forms a solidified layer S by irradiating the irradiation region of the material layer P with the laser beam L (S203).

The meter 6 obtains data about projections by measuring the height of each position of the surface of the solidified layer S from the reference surface (S205). The processor 762 acquires the data about the projections measured by the meter 6 and calculates at least one of the heights, the area, and the number of the projections based on the data. The processor 762 then makes at least one of the comparison between the heights of the projections and the first threshold, the comparison between the area of the projections and the second threshold, and the comparison between the number of the projections and the third threshold. Thus, it is determined whether the molded state of the solidified layer S is good or poor (S206).

If the molded state is good (YES in S207), formation of the material layer P and the solidified layer S, measurement of the surface state of the solidified layer S, and determination of the molded state of the solidified layer S are performed again (S202-S206). These steps are repeated until the molding of the desired three-dimensional molded object is complete (YES in S208).

If the processor 762 determines that the molded state of the solidified layer S is poor (NO in S207), the lamination molding apparatus 1 may stop the molding. Alternatively, if the processor 762 determines that the molded state of the solidified layer S is poor, the irradiator 5 may re-irradiate the projections with the laser beam L or the electron beam. This re-irradiation with the laser beam L or the electron beam may be performed on only the projections or the entire irradiation region. The re-irradiation with the laser beam L or the electron beam can improve the molded state.

The above-mentioned method for producing the three-dimensional molded object is able to mold the three-dimensional molded object while checking the molded state of each solidified layer S during molding and thus to produce a highly accurate three-dimensional molded object having good internal and external states. Also, if it is detected that the molded state of the solidified layer S is poor in the middle of molding, this method is able to stop the molding of the three-dimensional molded object or recover the poor state and thus to produce the three-dimensional molded object more efficiently.

The invention claimed is:

1. A method for producing a three-dimensional molded object, comprising:
   forming a solidified layer by irradiating an irradiation region of a material layer with a laser beam or an electron beam;
   obtaining data about projections having a height higher than a predetermined value formed on a surface of the solidified layer;
   calculating heights of the projections, an area of the projections, or the number of the projections based on the data; and
   determining an internal state of the solidified layer by making a comparison between the calculated heights of the projections and a first threshold relating to heights of the projections, between the calculated area of the projections and a second threshold relating to an area of the projections, or between the calculated number of the projections and a third threshold relating to the number of the projections;
   molding a test piece under the same condition as a condition under which the three-dimensional molded object is molded, before forming the solidified layer;
   obtaining data about projections formed on at least a part of a surface of a solidified layer of the test piece; and
   calculating the first threshold, the second threshold, or the third threshold based on the data about the projections of the test piece and an internal state of the test piece as confirmed by cutting the test piece.

2. The method for producing the three-dimensional molded object of claim 1, wherein
   the solidified layer of the test piece is in the same shape as a shape of the solidified layer of the three-dimensional molded object, and
   data about the projections formed on the entire surface of the solidified layer of the test piece is obtained.

3. The method for producing the three-dimensional molded object of claim 1, wherein if it is determined that the internal state of the solidified layer is lower than a predetermined level, molding of the three-dimensional molded object is stopped.

4. The method for producing the three-dimensional molded object of claim 1, wherein if it is determined that the internal state of the solidified layer is lower than a predetermined level, at least the projections are irradiated with the laser beam or the electron beam.

5. A lamination molding apparatus that molds a desired three-dimensional molded object, comprising:
   an irradiator configured to form a solidified layer by irradiating an irradiation region of a material layer with a laser beam or an electron beam;
   a meter configured to obtain data about projections having a height higher than a predetermined value formed on a surface of the solidified layer;
   a memory configured to store a first threshold relating to heights of the projections, a second threshold relating to an area of the projections, or a third threshold relating to the number of the projections; and
   a processor configured to calculate the heights of the projections, the area of the projections, or the number of the projections based on the data and to determine an internal state of the solidified layer by making a comparison between the calculated heights of the projections and the first threshold, between the calculated area of the projections and the second threshold, or between the calculated number of the projections and the third threshold; wherein
   before forming the solidified layer, the meter obtains data about projections formed on at least a part of a surface of a solidified layer of a test piece molded under the same condition as a condition under which the three-dimensional molded object is molded, and
   the first threshold, the second threshold, or the third threshold is calculated based on the data about the projections of the test piece and an internal state of the test piece as confirmed by cutting the test piece.

6. The lamination molding apparatus of claim 5, wherein
   the solidified layer of the test piece is in the same shape as a shape of the solidified layer of the three-dimensional molded object, and
   the meter obtains data about the projections) formed on the entire surface of the solidified layer of the test piece.

7. The lamination molding apparatus of claim 5, wherein if the processor determines that the internal state of the solidified layer is lower than a predetermined level, molding of the three-dimensional molded object is stopped.

8. The lamination molding apparatus of claim 5, wherein if the processor determines that the internal state of the solidified layer is lower than a predetermined level, the irradiator irradiates at least the projections with the laser beam or the electron beam.

* * * * *